US012216415B2

(12) United States Patent
Nakamura

(10) Patent No.: US 12,216,415 B2
(45) Date of Patent: Feb. 4, 2025

(54) REUSABLE TONER CONTAINER AND IMAGE FORMING APPARATUS

(71) Applicant: KYOCERA Document Solutions Inc., Osaka (JP)

(72) Inventor: Yuri Nakamura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 3 days.

(21) Appl. No.: 18/332,496

(22) Filed: Jun. 9, 2023

(65) Prior Publication Data

US 2023/0400794 A1 Dec. 14, 2023

(30) Foreign Application Priority Data

Jun. 10, 2022 (JP) ................................ 2022-094279

(51) Int. Cl.
*G03G 15/08* (2006.01)

(52) U.S. Cl.
CPC ..... *G03G 15/0886* (2013.01); *G03G 15/0875* (2013.01); *G03G 15/0894* (2013.01); *G03G 2215/00987* (2013.01); *G03G 2215/068* (2013.01)

(58) Field of Classification Search
CPC ........... G03G 15/0886; G03G 15/0875; G03G 15/0894; G03G 2215/068; G03G 2215/00987; B29C 73/06; B29C 73/14; B65D 47/12
USPC ........... 399/120, 262; 222/562, 563, DIG. 1; 264/36.15, 36.18, 918
See application file for complete search history.

(56) References Cited

U.S. PATENT DOCUMENTS 7,486,905 B2 2/2009 Nishimura et al.
8,244,154 B2 8/2012 Ito et al.
2004/0131383 A1* 7/2004 Fujita ................ G03G 15/0894 399/109
2008/0175629 A1* 7/2008 Eto ...................... G03G 15/087 399/262
2008/0199227 A1* 8/2008 Kawai ................ G03G 15/0855 399/262

(Continued)

FOREIGN PATENT DOCUMENTS

EP 1416333 A1 * 5/2004 ......... G03G 15/0894
JP 2006-208837 A 8/2006

(Continued)

*Primary Examiner* — Robert B Beatty
(74) *Attorney, Agent, or Firm* — Studebaker & Brackett PC

(57) ABSTRACT

A toner container includes a container body, a cap, bosses and a cover. The container body has a toner filling port. The cap is detachable and closes the filling port. The bosses are provided on the container body. The cover is detachably attached to the container body so as to cover the filling port and the bosses, and has a through hole through which each of the bosses penetrates. The boss has a tip end portion protruding from the cover through the through-hole. The tip end portion is provided so as to regulate detachment of the cover by being worked into a head portion having a cross-sectional area larger than the through-hole, and to permit the detachment of the cover by cutting off the head portion. The container body, the cap and the cover can be reused maximum by the number of times corresponding to the number of the bosses.

6 Claims, 6 Drawing Sheets

(56) References Cited

U.S. PATENT DOCUMENTS

| | | | | |
|---|---|---|---|---|
| 2009/0035010 | A1* | 2/2009 | Serizawa ........... | G03G 15/0898<br>399/106 |
| 2018/0364619 | A1* | 12/2018 | Taniya ............... | G03G 21/1633 |

FOREIGN PATENT DOCUMENTS

| | | | | |
|---|---|---|---|---|
| JP | 2008191401 | A | * | 8/2008 |
| JP | 2010-096828 | A | | 4/2010 |

* cited by examiner

REUSABLE TONER CONTAINER AND IMAGE FORMING APPARATUS

INCORPORATION BY REFERENCE

This application is based on and claims the benefit of priority from Japanese patent application No. 2022-094279 filed on Jun. 10, 2022, which is incorporated by reference in its entirety.

BACKGROUND

The present disclosure relates to a reusable toner container and an image forming apparatus including the toner container.

In recent years, there has been a growing trend to reuse a toner container in an electrophotographic image forming apparatus that use toner, such as a multifunctional peripheral and a printer.

For example, a developer cartridge (corresponding to the toner container) is configured such that a cylindrical toner filling port is closed by a cap. When the developer cartridge is reused, a part of the toner filling port is cut off together with the cap, and then another cap is inserted into the toner filling port to close the toner filling port. Alternatively, the toner container may also be configured such that the flange portion of the cap is adhered to the tip surface of the cylindrical filling port. When the toner container is reused, the cap including the flange portion is cut off together with the filling port, and then the flange portion of another cap is adhered to the tip surface of the filling port.

In addition, when reusing toner containers, in consideration of durability, it is necessary to grasp the number of times it is reused. For this reason, by changing the shape of the cap used at the time of reuse, it may be configured to grasp the number of times it is reused.

However, in the above toner containers, it is necessary to cut off a part of the cap and a part of the filling port when it is reused. Then, shavings and debris generated during the cutting off may enter the main body, so the main body needs to be cleaned carefully, which reduces the workability at the time of reuse. In addition, the cap is not reusable after the cutting off, resulting in increasing an amount of the waste. In addition, it is preferable that the number of times of reuse can be easily grasped visually.

SUMMARY

A toner container according to the present disclosure includes a container body, a cap, a plurality of bosses and a cover. The container body has a toner filling port. The cap is detachable and closes the filling port. The bosses are provided on the container body. The cover is detachably attached to the container body so as to cover the filling port and the bosses, and has a through hole through which each of the bosses penetrates. The boss has a tip end portion that protrudes from the cover through the through-hole when the cover is attached to the container body. The tip end portion is provided so as to regulate detachment of the cover from the container body by being worked into a head portion having a cross-sectional area larger than that of the through-hole after the cover is attached to the container body, and to permit the detachment of the cover from the container body by cutting off the head portion. The container body, the cap and the cover can be reused maximum by the number of times corresponding to the number of the bosses.

An image forming apparatus according to the present disclosure includes the toner container, and an image forming part which forms an image using the toner supplied from the toner container.

The objects, features, and advantages of the present disclosure will become more apparent from the following description. In the detailed description, reference is made to the accompanying drawings, and preferred embodiments of the present disclosure are shown by way of example in the accompanying drawings.

DETAILED DESCRIPTION

Hereinafter, with reference to the attached drawings, an image forming apparatus and a toner container according to one embodiment in the present disclosure will be described.

Figure 1:
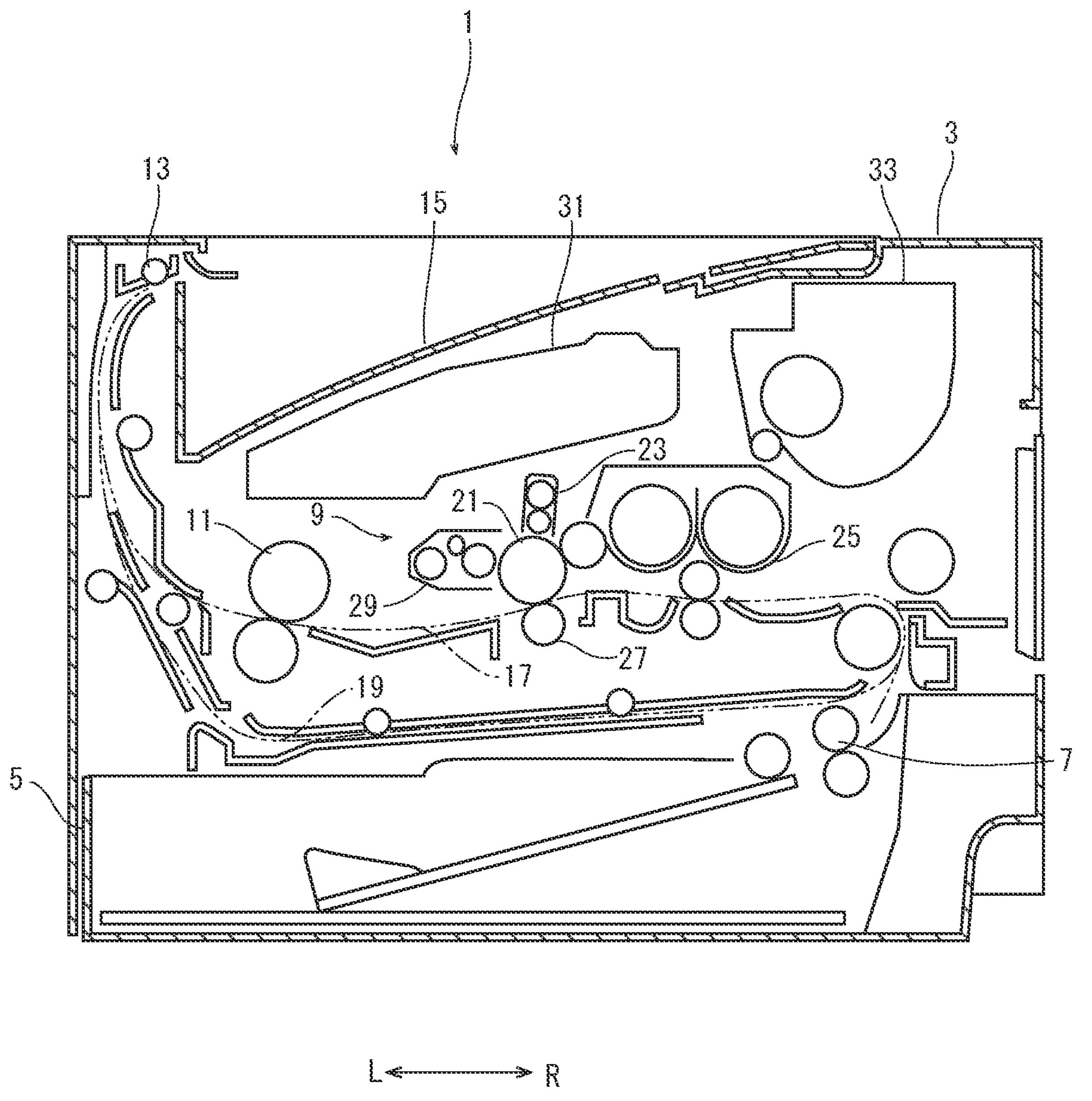
FIG. 1 is a front view schematically showing an inner structure of an image forming apparatus according to one embodiment of the present disclosure.

First, with reference to FIG. 1, an image forming apparatus 1 will be described. FIG. 1 is a front view schematically showing the inner structure of the image forming apparatus 1. Fr, Rr, L and R in each figure indicate the front, rear, left and right sides of the image forming apparatus 1, respectively.

The image forming apparatus 1 includes a hollow housing 3 having a nearly parallelepiped shape. Inside the housing 3, a sheet feeding cassette 5 in which a sheet is stored, a sheet feeding device 7 which feeds the sheet from the sheet feeding cassette 5, an image forming part 9 which forms a toner image on the sheet, a fixing device 11 which fixes the toner image on the sheet, and a discharging device 13 which discharges the sheet are housed. On the upper surface of the housing 3, a sheet discharge tray 15 on which the discharged sheet is stacked is formed. Further, a conveyance path 17 is formed inside the housing 3, along which the sheet is conveyed from the sheet feeding device 7 to the discharging device 13 through the image forming part 9 and the fixing device 11. Furthermore, inside the housing 3, an inversion path 19 is formed, which is branched from the conveyance path 17 on the downstream side of the fixing device 11 and merged with the conveyance path 17 on the upstream side of the image forming part 9.

The image forming part 9 includes a rotatable photosensitive drum 21, a charging device 23, a developing device 25, a transferring roller 27 and a cleaning device 29 which are arranged around the photosensitive drum 21 along the rotation direction of the photosensitive drum 21, an exposure device 31 and a toner container 33. A transfer nip is formed between the photosensitive drum 21 and the transferring roller 27. The toner container 33 is connected to the developing device 25, and toner is supplied from the toner container 33 to the developing device 25.

The image forming operation is briefly described. The sheet fed from the sheet feeding cassette 5 by the sheet feeding device 7 is conveyed along the conveyance path 17 to the image forming part 9. In the image forming part 9, the charging device 23 charges the surface of the photosensitive drum 21. The exposure device 31 exposes the surface of the photosensitive drum 21 charged by the charging device 23, and forms an electrostatic latent image corresponding to image data on the surface of the photosensitive drum 21. The developing device 25 develops the electrostatic latent image on the photosensitive drum 21 into a toner image using the toner supplied from the toner container 33. The transferring roller 27 transfers the toner image onto the sheet conveyed to the transfer nip along the conveyance path 17. The sheet on which the toner image is transferred is conveyed along the conveyance path 17 to the fixing device 11. The cleaning device 29 removes the toner remaining on the surface of the photosensitive drum 21 after the transferring. In the fixing device 11, the toner image is fixed on the sheet. The sheet on which the toner image is fixed is discharged to the sheet discharge tray 15 by the discharging device 13.

In the case of duplex printing, the sheet with the toner image fixed on one side by the fixing device 11 is switched back in the conveyance path 17, and then conveyed to the inversion path 19. Then, the sheet is conveyed from the inversion path 19 to the conveyance path 17, and then the toner image is formed on the other side of the sheet by the image forming part 9 and fixed on the other side by the fixing device 11. The sheet with the toner images fixed on both sides in this way is discharged to the sheet discharge tray 15 by the discharging device 13.

Figure 2A:
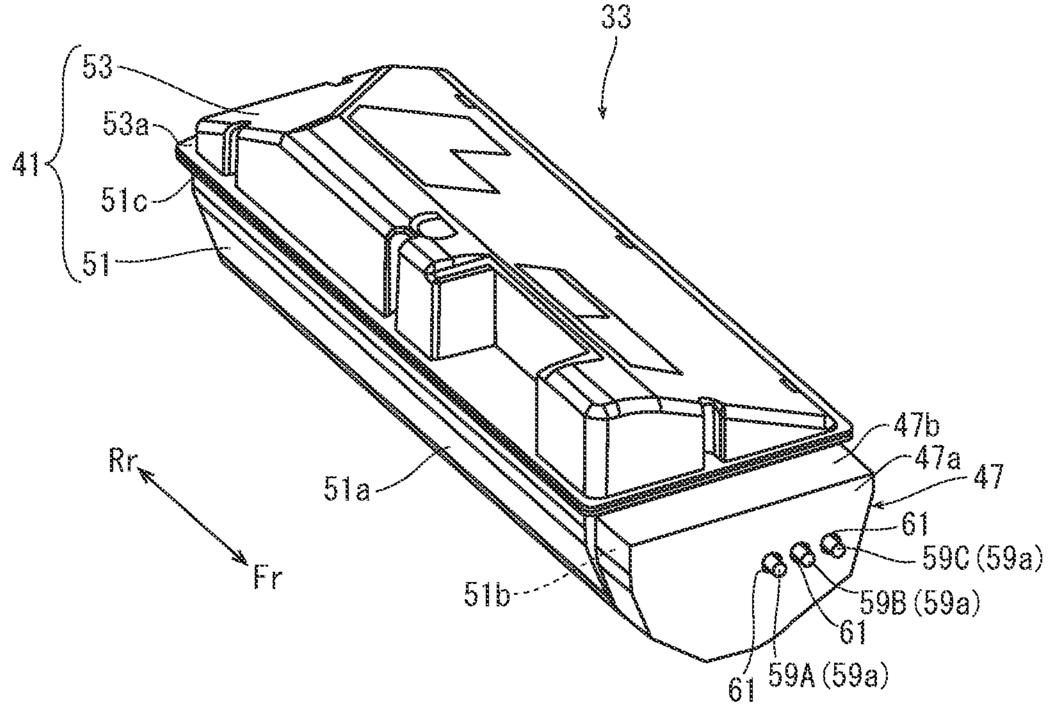
FIG. 2A is a perspective view showing a toner container according to the embodiment of the present disclosure.
Figure 2B:
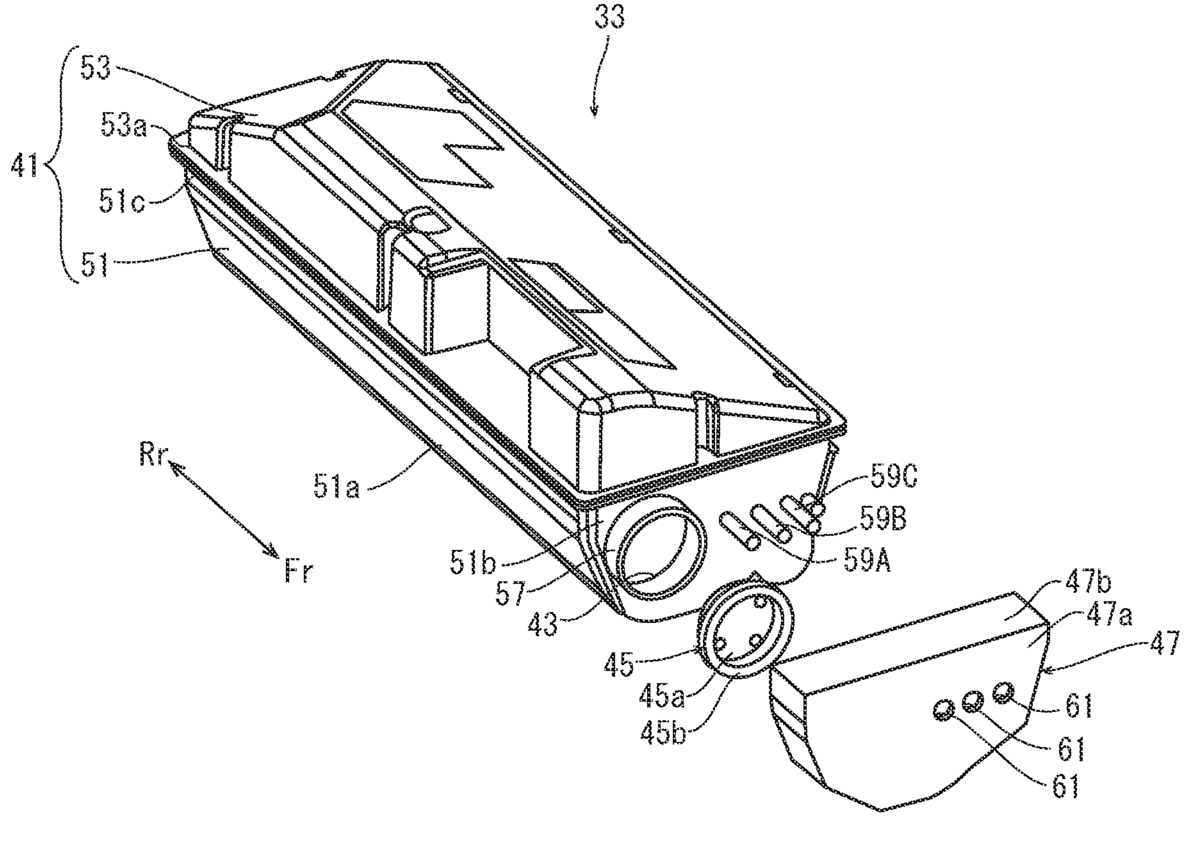
FIG. 2B is a disassembled perspective view showing the toner container according to the embodiment of the present disclosure.

Next, the toner container 33 will be described with reference to FIG. 2A and FIG. 2B. FIG. 2A is a perspective view showing the toner container 33, and FIG. 2B is a disassembled perspective view showing the toner container 33.

The toner container 33 includes a container body 41 having a toner filling port 43, a cap 45 closing the filling port 43, and a cover 47 detachably attached to the container body 41.

The container body 41 has a body part 51 with the upper surface opened and a lid part 53 with the lower surface opened. The body part 51 has an approximately half-cylindrical bottom plate 51*a* long in the front-and-rear direction and approximately semi-circular front and rear side plate 51*b*. The body part 51 is formed with a flange 51*c* extending outward around the upper surface opening. The lid part 53 is formed with a flange 53*a* extending outward around the lower surface opening. When both the flanges 51*c* and 53*a* are welded together, the body part 51 and the lid part 53 constitute the container body 41 having an inner space for storing the toner.

In one side plate 51*b*, the toner filling port 43 is formed. In addition, in the side plate 51*b*, a cylindrical portion 57 is formed around the filling port 43. Furthermore, in the side plate 51*b*, a plurality of (three, in this example) cylindrical bosses 59 (59A, 59B and 59C) are formed in a row near the filling port 43. The three bosses 59 have the same length, and are longer than the length of the cylindrical portion 57. The tip end portion of each boss 59 is formed to be workable by applying ultrasonic vibration. For example, the entire of the container body 41, the entire of the body part 51, or the entire of the bosses 59 may be made of material (for example, resin) that can be worked by applying ultrasonic vibration.

In the inner space of the container body 41, a stirring paddle and a conveying screw (both not shown) are rotatably housed. Furthermore, a toner discharge port (not shown) is formed on the bottom plate 51*a* of the body part 51. The discharge port communicates with the toner supply port (not shown) of the developing device 25. The discharge port can be opened and closed by means of a shutter (not shown).

The cap 45 has a closing portion 45*a* and an extending portion 45*b* that extends outward from the outer circumference of the closing portion 45*a*, and is made of resin such as rubber. The closing portion 45*a* has a bottomed cylindrical shape. The extending portion 45*b* has a triangular cross section. The cap 45 is press-fitted into the cylindrical portion 57 of the container body 41. That is, the closing portion 45*a* is pushed into the cylindrical portion 57, and the cylindrical portion 57 is fitted between the closing portion 45*a* and the extending portion 45*b*. Then, the inner circumferential surface of the cylindrical portion 57 and the outer circumferential surface of the closing portion 45*a* come into close contact with each other, and the outer circumferential surface of the cylindrical portion 57 and the inner circumferential surface of the extending portion 45*b* come into close contact with each other. Thus, the cap 45 closes the cylindrical portion 57, that is, the filling port 43. Since the cap 45 and the cylindrical portion 57 are not fixed together in this way, the cap 45 is detachable from the cylindrical portion 57.

The cover 47 has an end wall 47*a* of the same shape as the side plate 51*b* and a side wall 41*b* around the outer circumference of the end wall 47*a*. The cover 47 is attached to the body part 51 of the container body 41 by a snap-fit coupling so as to cover the cylindrical portion 57 (the filling port 43) and the three bosses 59. The end wall 47*a* has three circular through-holes 61 through which the three bosses 59 can penetrate. When the cover 47 is attached to the body part 51, the cap 45 attached to the cylindrical portion 57 is covered with the cover 47. The tip end portions 59*a* of the three bosses 59 protrude from the cover 47 through the through-holes 61, respectively.

Next, a reuse method of the toner container 33 having the above configuration will be described with reference to FIG. 3A to FIG. 6. FIG. 3A, FIG. 3B and FIG. 5A to FIG. 5C are sectional views showing the toner container 33, and FIG. 4 and FIG. 6 are side views showing the toner container 33.

Figure 3A:
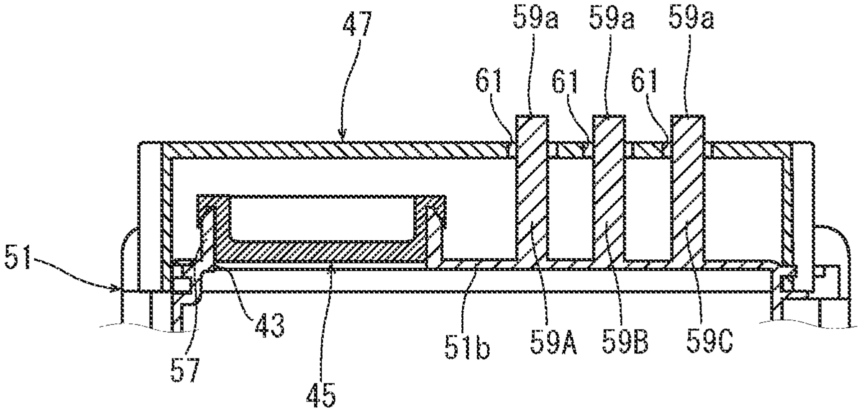
FIG. 3A is a sectional view showing the toner container (at an initial use) according to the embodiment of the present disclosure.

When the toner is filled for the initial time (the first time), the cover 47 and the cap 45 are detached from the container body 41, and then a predetermined amount of the toner is filled through the filling port 43. Then, as shown in FIG. 3A, the cap 45 is press-fitted into the cylindrical portion 57 to close the filling port 43, and then the cover 47 is attached to the body part 51 by a snap-fit coupling. The three bosses 59 pass through the through-holes 61 of the cover 47, and the tip end portions 59*a* protrude from the cover 47.

Figure 3B:
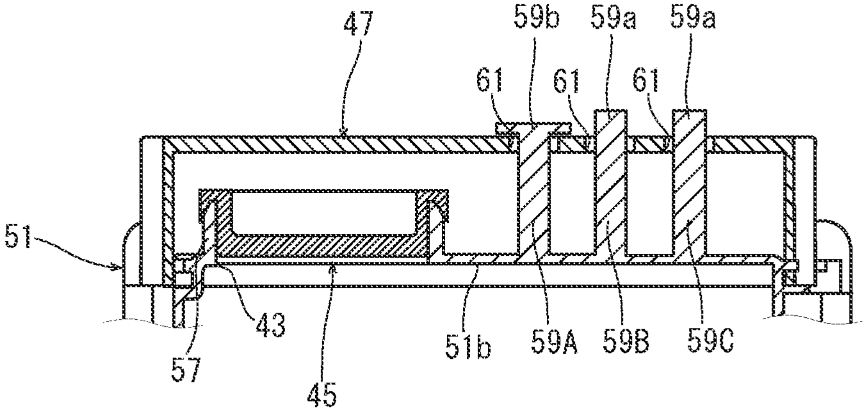
FIG. 3B is a sectional view showing the toner container (in a state where a tip end portion of a boss is worked into a head portion) according to the embodiment of the present disclosure.

Then, as shown in FIG. 3B, ultrasonic vibration is applied to the tip end portion 59*a* of the outermost (the leftmost) boss 59A to work it into a flat disk-shaped head portion 59*b* whose diameter is larger than that of the through-hole 61, in other words, whose cross-sectional area is larger than that of the through-hole 61. The head portion 59*b* is worked so as to be nearly in contact with the end wall 47*a* of the cover 47. The above process is defined as a start process. By working the tip end portion 59*a* of the boss 59 into the head portion 59*b*, the detachment of the cover 47 from the body part 51 is regulated by the head portion 59*b*. when the detachment of the cover 47 is thus regulated, the detachment of the cap 45 from the cylindrical portion 57 is also regulated. The first shipment is made in this state.

Figure 4:
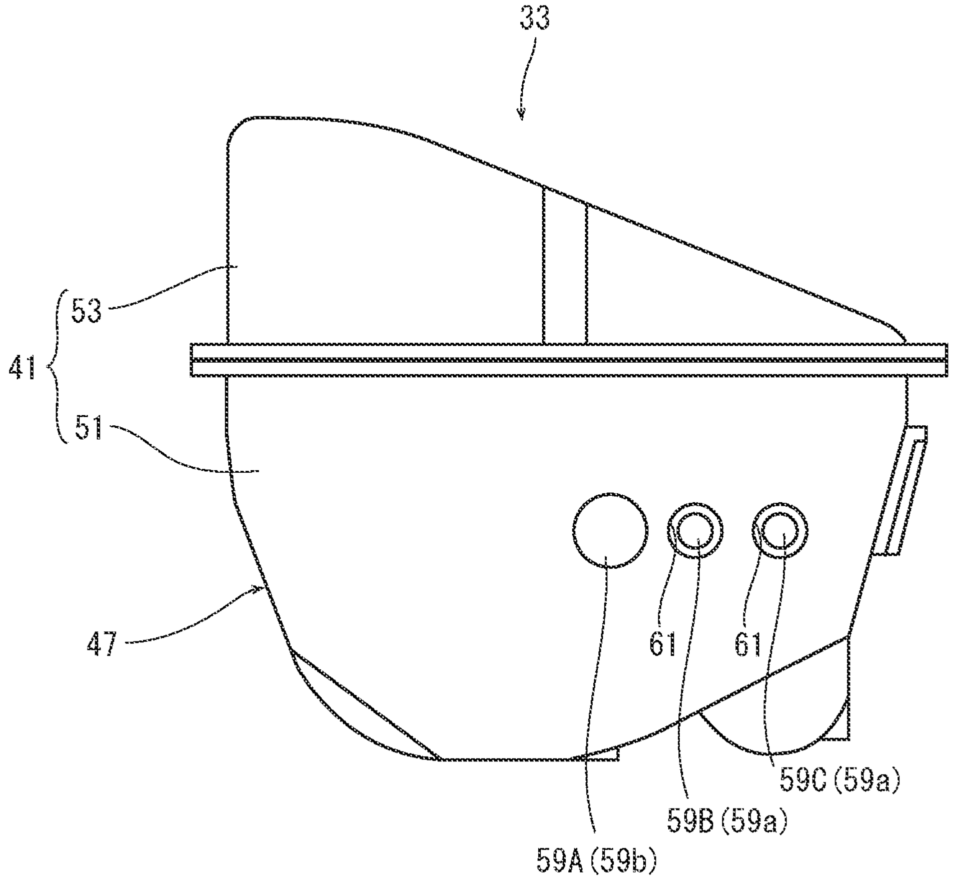
FIG. 4 is a side view showing the toner container (in the state where the tip end portion of the boss is worked into the head portion) according to the embodiment of the present disclosure.
Figure 5A:
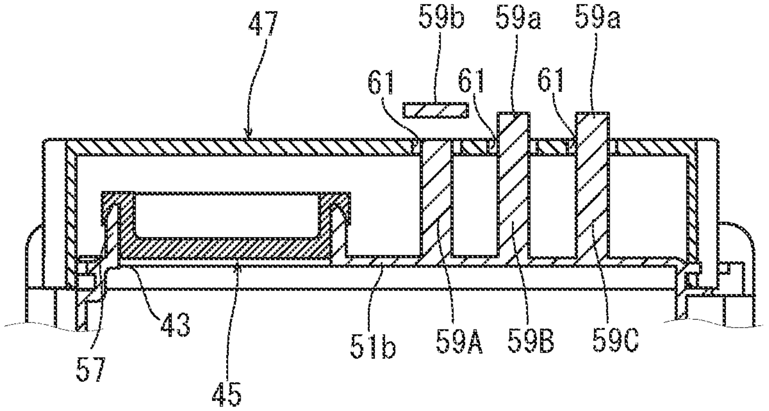
FIG. 5A is a sectional view showing the toner container (in a state where the tip end portion of the boss is cut off) according to the embodiment of the present disclosure.

At the first shipment, as shown in FIG. 4, the side surface of the toner container 33 shows that the head portion 59*b* of the outermost (the leftmost) boss 59A is exposed while the tip end portions 59*a* of the other bosses 59B and 59C are exposed. Since the diameter of the head portion 59*b* is different from the diameter of the tip end portion 59*a*, there is a difference in appearance between the outermost boss 59A and the other bosses 59B and 59C. Thus, by grasping that the shape of the outermost boss 59A is different from the shapes of the other bosses 59B and 59C, it is determined that the toner container 33 is in the first shipment.

After the first shipment, the toner container 33 is mounted in a predetermined position inside the housing 3, and the image forming operation described above is performed. When the toner concentration of the developing device 25 drops below the predetermined concentration during the image forming operation, the replenishment operation is performed such that the toner is replenished from the toner container 33 to the developing device 25. In the toner replenishment operation, the stirring paddle and the conveying screw rotate and the shutter is opened. As the stirring paddle rotates, the toner in the container body 41 is stirred and conveyed toward the conveying screw. Then, the toner is conveyed toward the discharge port by the rotation of the conveyance screw, and supplied to the developing device 25 through the discharge port. When the toner concentration in the developing device 25 reaches the predetermined concentration, the supply of toner is stopped. When such a replenishment operation is repeated and the toner in the container body 41 is consumed, the replacement of the toner container 33 is instructed and the toner container 33 is replaced.

When the toner container 33 is replaced, the toner container 33 is detached from the housing 3. Then, as shown in FIG. 5A, the head portion 59*b* of the outermost boss 59A is cut off using a tool (a plier, a nipper or the like). As a result, the regulating of the detachment of the cover 47 by the head portion 59*b* is released, and the cover 47 can be detached from the container body 41. When the head portion 59*b* is cut off, fine chips may be generated, but since the filling port 43 remains closed by the cap 45, there is no possibility that these chips enter the container body 41 through the filling port 43.

Figure 5B:
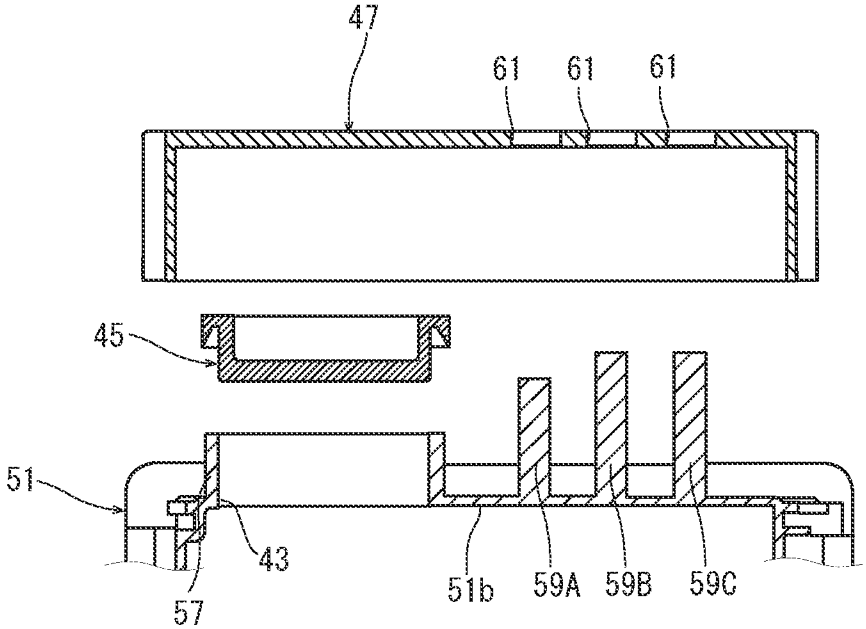
FIG. 5B is a sectional view showing the toner container (at reuse) according to the embodiment of the present disclosure.
Figure 6:
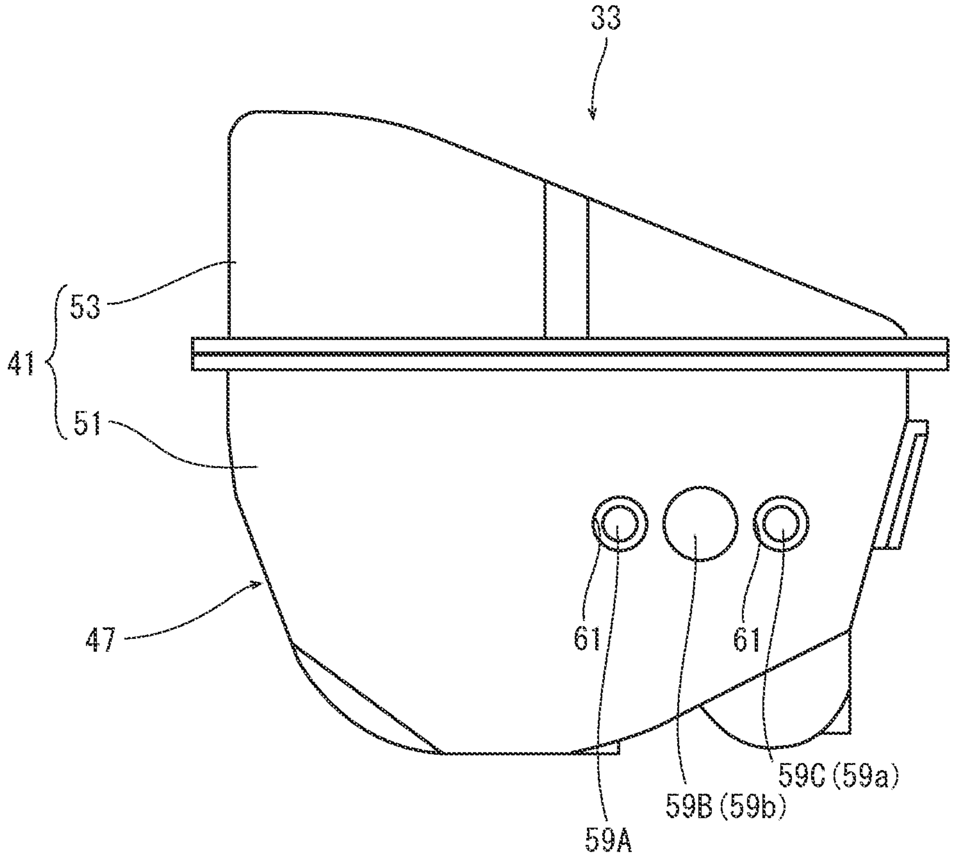
FIG. 6 is a side view showing the toner container (in the state where the tip end portion of the boss is worked into the head portion) of the toner container.

Then, as shown in FIG. 5B, after detaching the cover 47, the cap 45 is detached. That is, since the cover 47 is attached to the body part 51 by a snap-fit coupling, it can be easily detached from the body part 51 by releasing the snap-fit coupling. In addition, since the cap 45 is only press-fitted into the cylindrical portion 57, it can be easily detached from the cylindrical portion 57 by hand or with a tool. After detaching the cover 47 and cap 45 in this way, the inner space of the container body 41 is cleaned by air blowing. The above process is defined as a finish process.

Then, as in the first filling, a predetermined amount of the toner is filled into the container body 41 through the filling port 43. Then, after press-fitting the detached cap 45 into the cylindrical portion 57, the detached cover 47 is attached to the body part 51 by the snap-fit coupling. Then, the three bosses 59 are inserted into the through-holes 61 of the cover 47 respectively. In this case, the length of the outermost boss 59A is shorter than that of the other two bosses 59B and 59C because the head portion 59*b* is cut off. The tip end portions 59*a* of the other two bosses 59B and 59C protrude from the cover 47.

Figure 5C:
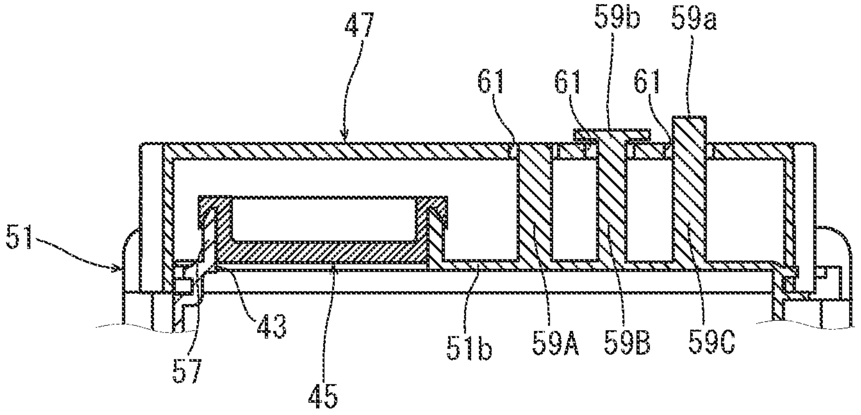
FIG. 5C is a sectional view showing the toner container (in the state where the tip end portion of the boss is worked into the head portion) according to the embodiment of the present disclosure.

Next, as in the case of the first boss 59B, the tip end portion 59*a* of the second boss 59B is applied with ultrasonic vibration so as to be worked into a flat disk-shaped head portion 59*b* as shown in FIG. 5C. As a result, the detachment of the cover 47 from the body part 51 is regulated by the head portion 59*b*, and the detachment of the cap 45 is also regulated. The second shipment is made in this condition.

At the second shipment, as shown in FIG. 6, the side surface of the toner container 33 shows that the head portion 59*b* of the second (the center) boss 59B is exposed while the first boss 59A is not exposed through the through-hole 61 and the tip end portion 59*a* of the third boss 59C is exposed. As described above, since the diameter of the head portion 59*b* is different from the diameter of the tip end portion 59*a*, there is a difference in appearance between the second boss 59B and the other bosses 59A and 59C. Furthermore, since the position of the head portion 59*b* on the side surface of the toner container 33 is different between the second shipment and the first shipment as shown in FIG. 4, it is easy to grasp that the shape of the side surface is different between the first shipment and the second shipment. Therefore, it can be determined that the toner container 33 is in the second shipment (use).

After the toner is consumed, the above start process is performed, and then the third shipment is made. In the start process of the third shipment, the tip end portion 59*a* of the third boss 59C is worked into the head portion 59*b*. After the shipping, the above finish process is performed after the toner is consumed. Thus, the toner container 33 can be reused three times by performing the start and finish processes for the number (three) of the bosses 59.

As is clear from the above description, according to the present disclosure, when the toner container 33 is reused, the cap 45 and the cylindrical portion 57 are not cut off and the filling port 43 remains closed so that chips and debris generated by the cutting off do not enter the container body 41. Therefore, the cleaning work can be carried out efficiently. Furthermore, by confirming the position of the head portion 59*b*, the number of times of reuse can be easily grasped. At this time, since the head portion 59*b* of the worked boss 59 and the tip end portion 59*a* of the other bosses 59 are clearly different in appearance, both can be easily distinguished.

Furthermore, since the position of the head portion 59*b* is different for the number of times of reuse, the difference in appearance of the toner container 33 for the number of times of reuse can be easily grasped. Numbers or symbols representing the number of times of use may be written on the cover 47 corresponding to each of the bosses 59. This makes it easier to grasp how many shipments (uses) have been made.

Furthermore, by providing the cover 47 on the outside of the cap 45, the leakage of the toner through the filling port 43 can be reliably prevented and the strength of the toner container 33 can be enhanced. Furthermore, in addition to the container body 41, the cap 45 and the cover 47 can also be reused, thus reducing the amount of waste generated during reuse.

The number of times the toner container 33 is reused does not necessarily have to be the same as the number of bosses 59. If the container body 41 is damaged or deteriorated before being used for the original number of reuse times, the number of reuse times is less than the number of bosses 59. The number of bosses 59 is not limited to three, and can be changed appropriately according to the model of the image forming apparatus 1. Moreover, although the bosses 59 need not always be arranged in a row, it is preferable that they are arranged in a row because it is easy to check the number of times of reuse. The cap 45 may also be attached to the cylindrical portion 57 by a screw, and the cover 47 may be attached to the body part 51 by press-fitting.

In addition, the method of working the tip end portion 59*a* of the boss 59 into the head portion 59*b* can be applied by applying heat, in addition to applying ultrasonic vibration.

While this disclosure has been described for specific embodiment (s), this disclosure is not limited to the above. To the extent that it does not deviate from the scope and spirit of this disclosure, a person skilled in the art may modify the above embodiment.

The invention claimed is:

1. A toner container comprising:

a container body having a toner filling port;

a detachable cap closing the filling port;

a plurality of bosses provided on the container body; and a cover that is detachably attached to the container body so as to cover the filling port and the bosses and has a through-hole through which each of the bosses penetrates, wherein the bosses have a tip end portion that protrudes from the cover through the through-hole when the cover is attached to the container body, the tip end portion is provided so as to regulate detachment of the cover from the container body by being worked into a head portion having a cross-sectional area larger than that of the through-hole after the cover is attached to the container body, and to permit the detachment of the cover from the container body by cutting off the head portion, by working the tip end portion into the head portion of the bosses one by one only once, the container body, the cap and the cover can be used by the number of times corresponding to the number of the bosses, a number of the boss from which the head portion is cut off represents the number of times of use, and the head portion and the tip end portion are always visible.

2. The toner container according to claim 1, wherein the tip end portion of the bosses are worked into the head portion by applying ultrasonic vibration.

3. The toner container according to claim 1, wherein the cap is press-fitted into the filling port to close the filling port, and the cover is attached to the container body by a snap-fit coupling.

4. The toner container according to claim 1, wherein a difference in appearance between the tip end portion and the head portion is visible.

5. An image forming apparatus comprising:

the toner container according to claim 1, and an image forming part which forms an image using the toner supplied from the toner container.

6. The toner container according to claim 1, wherein a number or symbol representing the number of times of use is written on the cover corresponding to each of the bosses.

* * * * *